(12) United States Patent
Hartsuiker, Sr. et al.

(10) Patent No.: US 7,281,624 B2
(45) Date of Patent: Oct. 16, 2007

(54) AIR SUPPORTED IMPACT SECTION FOR AIR SUPPORTED BELT CONVEYORS

(75) Inventors: Hendrik Hartsuiker, Sr., County of Litchfield, CT (US); Hendrik Hartsuiker, Jr., County of Passaic, NJ (US)

(73) Assignee: The Hendrik Group, Inc., Pompton Lakes, NJ (US)

( * ) Notice: Subject to any disclaimer, the term of this patent is extended or adjusted under 35 U.S.C. 154(b) by 0 days.

(21) Appl. No.: 11/436,298

(22) Filed: May 18, 2006

(65) Prior Publication Data

US 2006/0260912 A1 Nov. 23, 2006

Related U.S. Application Data

(60) Provisional application No. 60/594,925, filed on May 19, 2005.

(51) Int. Cl.
*B65G 15/08* (2006.01)

(52) U.S. Cl. ..................... 198/811; 198/823

(58) Field of Classification Search ............... 198/811, 198/823, 821, 841, 842; 193/3, 2 R, 25 A
See application file for complete search history.

(56) References Cited

U.S. PATENT DOCUMENTS

| | | | | |
|---|---|---|---|---|
| 5,038,924 A | * | 8/1991 | Stoll | 198/823 |
| 5,368,154 A | * | 11/1994 | Campbell | 198/823 |
| 5,467,866 A | * | 11/1995 | Swinderman | 198/841 |
| 5,660,283 A | * | 8/1997 | Groh et al. | 198/690.2 |
| 5,735,377 A | * | 4/1998 | Herren | 193/33 |
| 5,829,577 A | * | 11/1998 | Grisley | 198/811 |
| 6,454,083 B2 | * | 9/2002 | Burkhart et al. | 198/823 |
| 2004/0118661 A1 | * | 6/2004 | Swinderman et al. | 198/811 |

* cited by examiner

*Primary Examiner*—James R. Bidwell
(74) *Attorney, Agent, or Firm*—Howard C. Miskin, Esq.; Gloria Tsui-Yip, Esq.

(57) ABSTRACT

An improved air supported impact section for air supported belt conveyors that includes a cushioned pad incorporated into the plenum plate to cushion the impact form and minimize damage to the air supported belt conveyors.

13 Claims, 5 Drawing Sheets

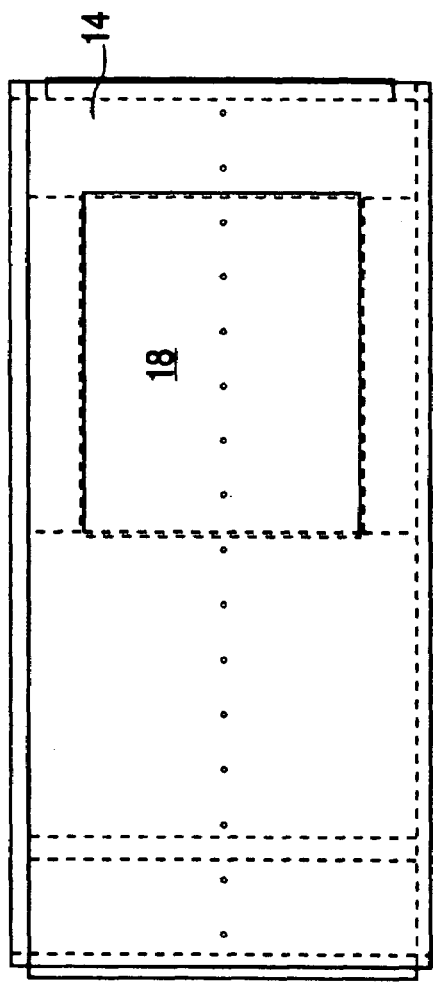
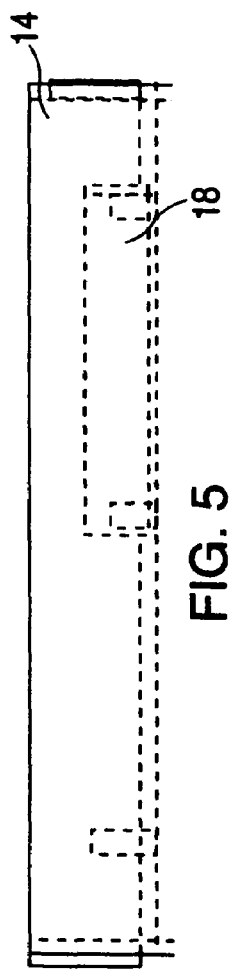

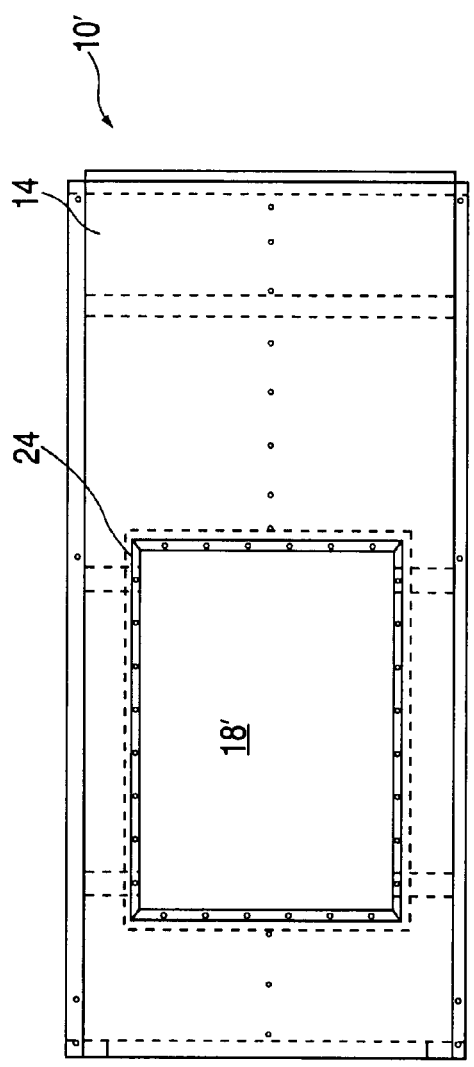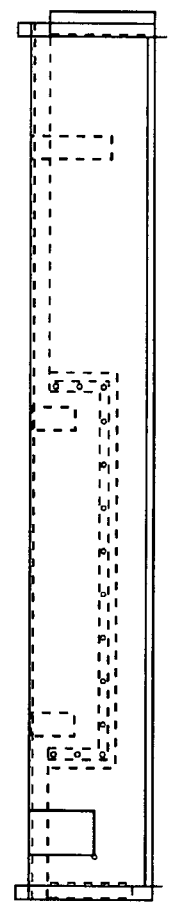
FIG. 7
FIG. 8

AIR SUPPORTED IMPACT SECTION FOR AIR SUPPORTED BELT CONVEYORS

This application claims the benefit of U.S. Provisional Patent Application No. 60/594,925, filed May 19, 2005.

FIELD OF THE INVENTION

The invention relates to an air supported impact section for air supported belt conveyors. Specifically, it relates to an improved impact section that minimizes damage to the conveyor belt.

BACKGROUND OF THE INVENTION

Conventional belt conveyors use idlers to support the length of the belt. The trough formed by the idlers and belt typically has a V-shape cross section for holding the material being carried along the belt conveyor. The V-shape cross section disadvantageously creates a pinch point at the bottom of the V-shape. Conventional belt conveyors also disadvantageously have belt sag between idlers and idler bumping causing material to be thrown up every time it goes over an idler, resulting in dust generations, product separation and degradation.

At the loading zones where material are loaded onto a belt conveyor, impact resulting from lump size, material density and height of material free fall could seriously damage the belt. In a conventional belt conveyor system, at the impact section, impact idlers are used. Impact idlers are generally cushioned to sustain the impacting force of dropped objects.

The vertical velocity of the material dropped from various heights above the belt surface and the horizontal belt speed will be different than the speed of the material when it contacts the belt, resulting in greater impact and shearing forces on the belt. Lumpy materials can cause appreciable impact on the belt. The heavier the lump, the greater height of fall or the greater its angular velocity when it contacts the belt, the greater will be the energy tending to rupture the belt. When the material strikes the belt directly over a conventional belt conveyor with idlers, damages to the carcass can result from the crushing action of the lump against the idlers.

Air supported belt conveyors (ASBC) overcome many of the disadvantages of conventional belt conveyors. As shown in FIG. 1, an ASBC 1 includes a large air chamber 2 with a curve plenum plate 3 forming the upper section of the air chamber 2. Along the length of the plenum plate 3 are a plurality of holes 4. A plenum bed 5 (i.e. belt) rests on top of the plenum plate 3 for holding the material 6 being carried along the ASBC. An ASBC may optionally include a roof cover (not shown). When air is blown into the air chamber 2, air travels through the holes 4 forming a film of air between the plenum plate 3 and plenum bed 5. The entire length of the plenum bed 5 and load of the ASBC is fully supported by a thin cushion of air and advantageously prevent belt sag and idler bumping of conventional belt conveyors. The curvature of the plenum plate 3 and plenum bed 5 also advantageously avoid pinching as in conventional belt conveyors. Further, the lack of idlers produces less friction than conventional belt conveyors. Because impact idlers are not used, there is a need for an improved impact section at the loading zone of an ASBC to minimize damage to the ASBC.

SUMMARY OF THE INVENTION

The present invention is an improved impact section that minimizes damage to the conveyor belt. In particular, an air supported impact section for ASBC.

The impact section of the present invention includes a cushioned pad incorporated into the plenum plate to cushion the impact force and minimize damage to the plenum plate, plenum bed, roof cover and carcass. The pad may be cast directly into the plenum plate during the manufacturing process. The pad may be made of urethane and absorbs most of the energy from the falling material. The pad has the same catenary curve profile as the plenum plate. A plurality of holes similar in size and spacing as those along the plenum plate are provided along the pad to provide continuous air film to support the plenum bed and load. Materials falling into the improved impact section of the present invention is immediately lifted and exited from the loading zone because the plenum bed is supported by a cushion of air and eliminates damages to both the plenum bed and plenum plate.

BRIEF DESCRIPTION OF THE DRAWINGS

Preferred embodiments of the present invention have been chosen for purposes of illustration and description and are shown in the accompanying drawings forming a part of the specification wherein:

FIG. 4 shows a top view of the air supported impact section of the present invention.

FIG. 5 shows a side view of the air supported impact section of the present invention.

FIG. 7 shows a top view of the removable air supported impact section of the present invention.

FIG. 8 shows a side view of the removable air supported impact section of the present invention.

DETAILED DESCRIPTION OF THE PREFERRED EMBODIMENTS

Figure 1:
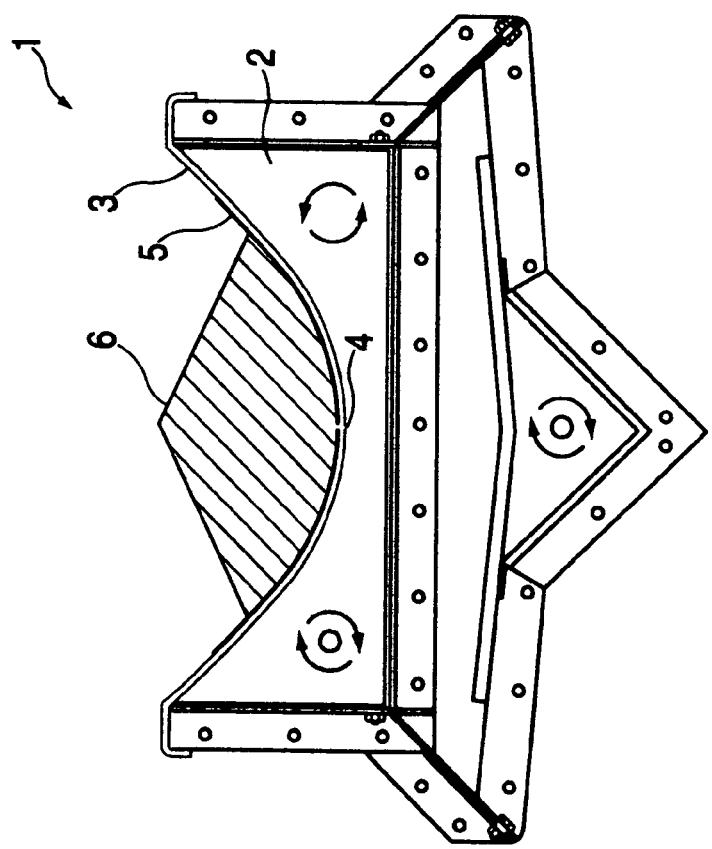
FIG. 1 shows a cross sectional view of an air supported belt conveyor (ASBC).
Figure 2:
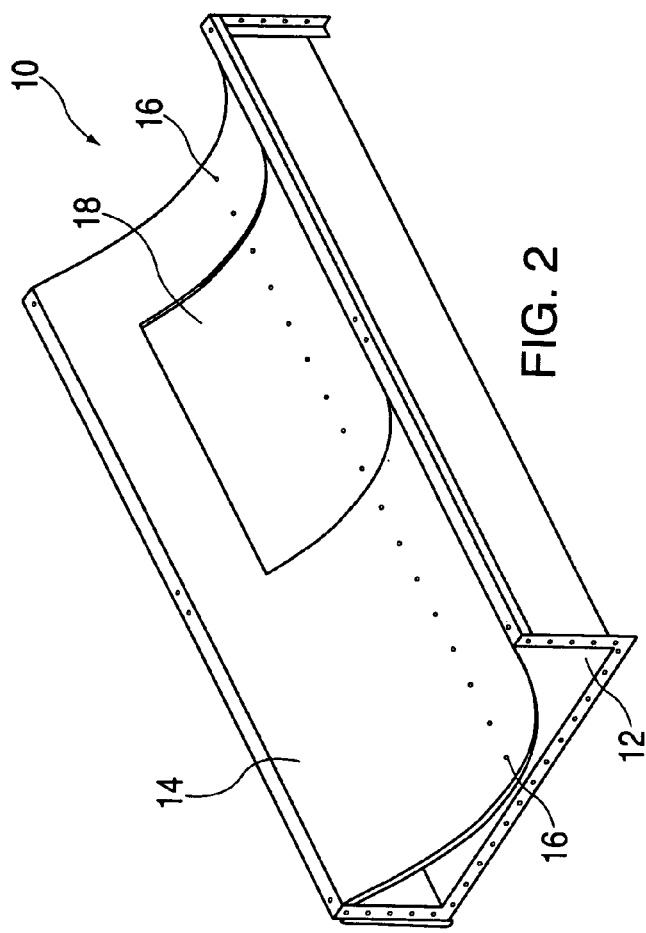
FIG. 2 shows a perspective view of the air supported impact section of the present invention.
Figure 3:
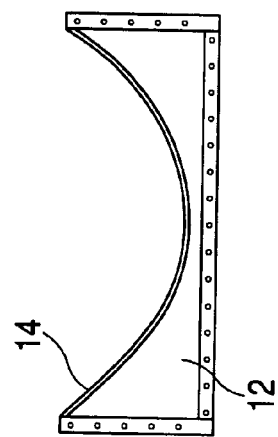
FIG. 3 shows a cross sectional view of the air supported impact section of the present invention.

With reference to the drawing wherein the same reference number illustrates the same element throughout, FIGS. 2-5 show an air supported impact section 10 of the present invention for an air supported belt conveyor (ASBC) such as that shown in FIG. 1. The air supported impact section 10 includes an air chamber 12 with a plenum plate 14 forming the upper section of the air chamber 12. The plenum plate 14 has a curved profile, e.g. 20, 35, or 45 degrees. The plenum plate 14 has a plurality of equally-spaced holes 16 along the centerline where air is forced from the air chamber 12. A plenum bed, i.e. belt (not shown), rests on top of the plenum plate 3 for holding the material being carried along the ASBC.

A section of the plenum plate 14 incorporates a rectangular shaped pad 18 that cushions the impact force from material dropped at the loading zone. The pad 18 may be made from a urethane, neoprene, or polymer material, etc. The pad 18 has the same catenary curve profile as the plenum plate 14. Similar to the plenum plate 14, the pad 18 has a plurality of equally-spaced holes 16 along the centerline to allow air to travel through to lift the plenum bed that rests on top of the pad 18. The pad 18 may be molded directly into an opening of the plenum plate 14 during the manufacturing process. During the molding process of the pad 18, a cover plate with pins that have the same diameter and spacing as the holes 16 on the plenum plate 14 is used.

Materials entering the ASBC are first directed to the air supported impact section 10. The materials are channeled and directed to the pad 18 of the impact section 10. Immediately after the materials fall onto the plenum bed, the cushion of air between the pad 18 and plenum bed lifts the material to allow the material to exit from the loading zone onto the ASBC, which eliminates damages to both the plenum bed and plenum plate 14.

Figure 6:
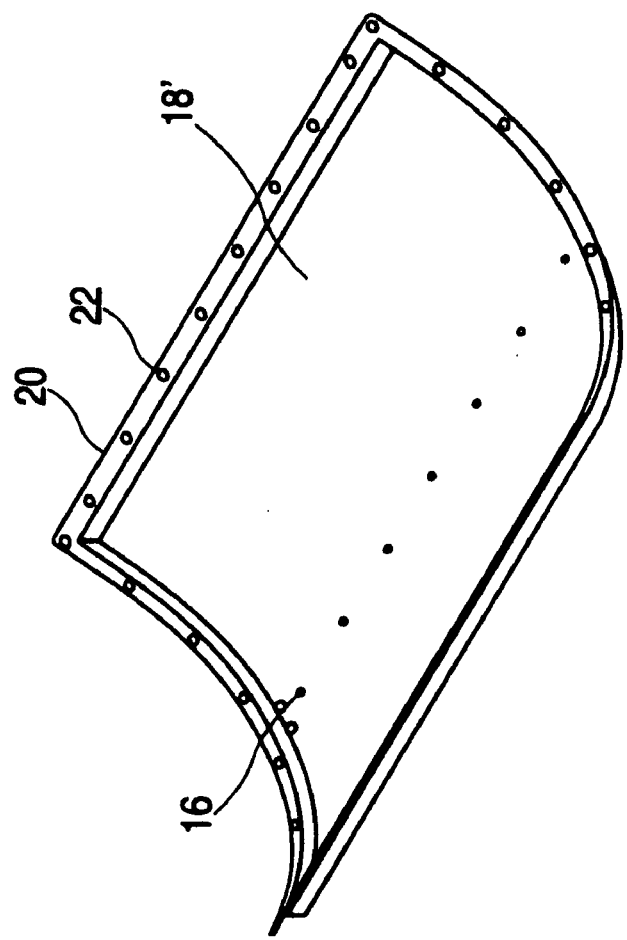
FIG. 6 shows a perspective view of a removable air supported impact section of the present invention.

As shown in FIGS. 6-8, the air supported impact section 10' has a pad 18' that may be removably attached to the plenum plate 14 to facilitate replacement of a damaged or worn pad 18'. The pad 18' has a circumferential edge 20 where a plurality of fastening means 22 are provided for removable attachment to an opening 24 of the plenum plate 14. Fastening means 22 can be rivets, nuts and bolts, clamps, etc.

The size, shape and location of the pad 18 or 18' on the plenum plate 14 may vary based on the particular application of the ASBC. The air supported impact section 10 or 10' can be used for belt widths from 12" to 120".

Although certain features of the invention have been illustrated and described herein, other better modifications and changes will occur to those skilled in the art. It is, therefore, to be understood that the appended claims are intended to cover all such modification and changes that fall within the spirit of the invention.

What I claim is:

1. An air supported impact section for an air supported belt conveyor having a plenum plate with a predetermined curved profile, comprising:
   an opening on the plenum plate;
   a pad having the predetermined curved profile of the plenum plate attaching to said opening, wherein said pad is made of a cushioned material.

2. The air supported impact section of claim 1 wherein the plenum plate further having a plurality of spaced apart predetermined sized holes, further comprising:
   a plurality of spaced apart predetermined sized holes as the plenum plate on said pad.

3. The air supported impact section of claim 2 wherein the predetermined sized holes of the air supported belt conveyor and the plurality of spaced apart predetermined holes on said pad are centrally aligned.

4. The air supported impact section of claim 1 wherein said pad is made of urethane.

5. The air supported impact section of claim 1 wherein said pad is made of neoprene.

6. The air supported impact section of claim 1 wherein said pad is made of polymer.

7. The air supported impact section of claim 1 wherein said opening and said pad are rectangular shaped.

8. The air supported impact section of claim 1 wherein said pad is molded onto said opening of the plenum plate.

9. The air supported impact section of claim 1 wherein said pad is removably attachable to said opening of the plenum plate.

10. The air supported impact section of claim 9 wherein said pad having a circumferential edge with at least one fastening means for attaching said pad to said opening.

11. An air supported impact section of an air supported belt conveyor that holds and carries material, comprising:
    an air chamber;
    a plenum plate forming the upper section of said air chamber, said plenum plate having a predetermined curved profile and a plurality of predetermined sized holes equally spaced apart for air from said air chamber to travel through;
    an opening on said plenum plate;
    a pad made of a cushioned material attaching to said opening, wherein said pad having the predetermined curved profile of said plenum plate and a plurality of predetermined sized holes equally spaced apart as said plenum plate;
    a plenum bed for holding and carrying material resting on said plenum plate;
    wherein a film of air forms between said plenum plate and said plenum bed when air travels from the air chamber through said holes of said plenum plate and said pad.

12. A method of making an air supported impact section for an air supported belt conveyor having a plenum plate with a predetermined curved profile, comprising the steps of:
    providing an opening on the plenum plate;
    providing a pad made of a cushioned material and having the predetermined curved profile of the plenum plate; and
    molding said pad onto the plenum plate to cover the opening.

13. The method of claim 12 wherein the plenum plate further having a plurality of spaced apart predetermined sized holes, further comprising the steps of:
    providing a cover plate having a plurality of pins similarly sized and spaced apart to correspond to the predetermined sized holes of the plenum plate;
    using said cover plate when molding said pad onto the plenum plate such that a plurality of holes of the predetermined sized holes of the plenum plate is formed on said pad.

* * * * *